United States Patent
Sung et al.

(10) Patent No.: US 10,803,877 B2
(45) Date of Patent: Oct. 13, 2020

(54) SIGNAL PROCESSING METHODS AND APPARATUSES FOR ENHANCING SOUND QUALITY

(71) Applicant: SAMSUNG ELECTRONICS CO., LTD., Suwon-si (KR)

(72) Inventors: Ho-sang Sung, Yongin-si (KR); Holly Francois, Guildford (GB); Ki-hyun Choo, Seoul (KR); Eun-mi Oh, Seoul (KR); Kyung-hun Jung, Seoul (KR); Yaodu Wei, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 200 days.

(21) Appl. No.: 15/757,547

(22) PCT Filed: Sep. 5, 2016

(86) PCT No.: PCT/KR2016/009935
§ 371 (c)(1),
(2) Date: Mar. 5, 2018

(87) PCT Pub. No.: WO2017/039422
PCT Pub. Date: Mar. 9, 2017

(65) Prior Publication Data
US 2019/0027156 A1    Jan. 24, 2019

(30) Foreign Application Priority Data
Sep. 4, 2015 (KR) .................. 10-2015-0125874

(51) Int. Cl.
*G10L 21/00* (2013.01)
*G10L 19/028* (2013.01)
(Continued)

(52) U.S. Cl.
CPC ........... *G10L 19/028* (2013.01); *G10L 19/22* (2013.01); *G10L 21/0208* (2013.01);
(Continued)

(58) Field of Classification Search
CPC ... G10L 19/028; G10L 19/22; G10L 21/0208; G10L 21/038; G10L 19/265;
(Continued)

(56) References Cited

U.S. PATENT DOCUMENTS 8,666,753 B2    4/2014 Francois
2010/0049342 A1    2/2010 Ramabadran et al.
(Continued)

FOREIGN PATENT DOCUMENTS

EP    0 996 112 A2    4/2000
KR    10-0746050 B1    8/2007
KR    10-2008-0066537 A    7/2008

OTHER PUBLICATIONS

Communication dated Jun. 1, 2018 by the European Patent Office in counterpart European Patent Application No. 16842388.7.
(Continued)

*Primary Examiner* — Thierry L Pham
(74) *Attorney, Agent, or Firm* — Sughrue Mion, PLLC

(57) ABSTRACT

Provided are a signal processing method and apparatus for enhancing sound quality. The signal processing method performed by a signal transmitting apparatus includes determining, based on a plurality of parameters, a valid bandwidth so as to encode an input signal; performing pre-processing on the input signal, based on the valid bandwidth; and encoding the pre-processed input signal, based on the valid bandwidth, and the signal processing method performed by a signal receiving apparatus includes decoding a bitstream or a packet received via a transmission channel; determining a valid bandwidth, based on a plurality of
(Continued)

parameters used in the decoding; and performing post-processing on a decoded signal, based on the valid bandwidth.

9 Claims, 19 Drawing Sheets

(51) Int. Cl.
| | |
|---|---|
| *G10L 19/22* | (2013.01) |
| *G10L 21/0208* | (2013.01) |
| *G10L 21/02* | (2013.01) |
| *G10L 19/26* | (2013.01) |
| *G10L 21/038* | (2013.01) |
| *G10L 19/00* | (2013.01) |
| *H04M 3/22* | (2006.01) |

(52) U.S. Cl.
CPC .......... *G10L 19/265* (2013.01); *G10L 21/038* (2013.01); *G10L 2019/0013* (2013.01); *H04M 3/2236* (2013.01)

(58) Field of Classification Search
CPC ............. G10L 2019/0013; G10L 19/02; G10L 19/008; H04M 3/2236
USPC .......................................................... 704/227
See application file for complete search history.

(56) References Cited

U.S. PATENT DOCUMENTS

| | | | |
|---|---|---|---|
| 2011/0202353 A1* | 8/2011 | Neuendorf | .............. G10L 19/20 704/500 |
| 2012/0316885 A1 | 12/2012 | Gibbs | |
| 2014/0369508 A1 | 12/2014 | Forrester | |

OTHER PUBLICATIONS

International Search Report (PCT/ISA/210) and Written Opinion (PCT/ISA/237) dated Feb. 15, 2017 by the International Searching Authority in counterpart International Patent Application No. PCT/KR2016/009935.

\* cited by examiner

SIGNAL PROCESSING METHODS AND APPARATUSES FOR ENHANCING SOUND
QUALITY

TECHNICAL FIELD

The present disclosure relates to audio and/or speech signal processing, and more particularly, to a signal processing method and apparatus for enhancing sound quality of an audio and/or speech signal.

BACKGROUND ART

Unlike coding of a narrowband audio and/or speech signal, in coding of a wideband, super wideband, or full-band audio and/or speech signal, a bandwidth of an actually input signal may be narrower than a bandwidth supported by each mode.

In this case, a valid bandwidth of the input signal may be checked at an encoder end and a coding mode may be changed based on the checked valid bandwidth, based on the checked valid bandwidth. As a result, available bits for coding are concentrated on the valid bandwidth such that sound quality may be enhanced.

DESCRIPTION OF EMBODIMENTS

Technical Problem

Provided are a signal processing method and apparatus for enhancing sound quality, based on a search for a coding band of an audio signal and/or a speech signal.

Solution to Problem

According to an aspect of the present disclosure, there is provided a signal processing including: determining a valid bandwidth, based on a plurality of parameters required for encoding an input signal; performing pre-processing on the input signal, based on the valid bandwidth; and encoding the pre-processed input signal, based on the valid bandwidth.

The plurality of parameters required for encoding an input signal may include at least one of a bit-rate, a sampling frequency, and a bandwidth.

The bit-rate, the sampling frequency, and the bandwidth may be determined via a call condition negotiation process between terminals.

The method may further include generating a bitstream as a packet having a preset format, wherein the bitstream is generated as a result of the encoding.

The determining of the valid bandwidth may include: converting the input signal to a frequency-domain signal; classifying the frequency-domain signal; and searching for and selecting the valid bandwidth of the input signal, based on a threshold value that is set according to a result of the classifying.

The determining of the valid bandwidth may include: converting the input signal to a frequency-domain signal; removing a noise component from the frequency-domain signal; and searching for and selecting the valid bandwidth with respect to an active signal that is left after the removing of the noise component.

The encoding may be performed by limiting at least one of a maximum band and a minimum band, based on the bandwidth.

The performing of the pre-processing may include performing at least one of low-pass filtering processing and bandwidth extension processing.

According to an aspect of the present disclosure, there is provided a signal processing method including: decoding a bitstream or a packet received via a transmission channel; determining a valid bandwidth, based on a plurality of parameters used in the decoding; and performing post-processing on a signal resulting from the decoding, based on the valid bandwidth.

The plurality of parameters may include at least one of a bit-rate, a sampling frequency, and a bandwidth.

The bit-rate, the sampling frequency, and the bandwidth may be determined via a call condition negotiation process between terminals.

The determining of the valid bandwidth may include: converting the decoded signal to a frequency-domain signal; classifying the frequency-domain signal; and searching for and selecting the valid bandwidth of the decoded signal, based on a threshold value that is set according to a result of the classifying.

The determining of the valid bandwidth may include: converting the decoded signal to a frequency-domain signal; removing a noise component from the frequency-domain signal; and searching for and selecting the valid bandwidth with respect to an active signal that is left after the removing of the noise component.

The performing of the post-processing may include performing at least one of low-pass filtering processing and band extension processing.

According to an aspect of the present disclosure, there is provided a signal transmitting apparatus including: a processor configured to generate a bitstream by determining a valid bandwidth, based on a plurality of parameters required for encoding an input signal, performing pre-processing on the input signal, based on the valid bandwidth, and encoding the pre-processed input signal, based on the valid bandwidth; and a communicator configured to transmit the bitstream provided from the processor.

The processor may be further configured to encode the pre-processed input signal by limiting at least one of a maximum band and a minimum band, based on the bandwidth.

According to an aspect of the present disclosure, there is provided a signal receiving apparatus including: a communicator configured to receive a bitstream or a packet via a transmission channel; and a processor configured to decode the bitstream or the packet, determine a valid bandwidth, based on a plurality of parameters used in the decoding, and perform post-processing on a signal resulting from the decoding, based on the valid bandwidth.

Advantageous Effects of Disclosure

It is possible to enhance call quality by searching for and selecting optimal coding bandwidths of a voice and/or audio signal, and by performing pre-processing at a transmitter or post-processing at a receiver, based on a searched for and selected bandwidth.

MODE OF DISCLOSURE

Figure 1:
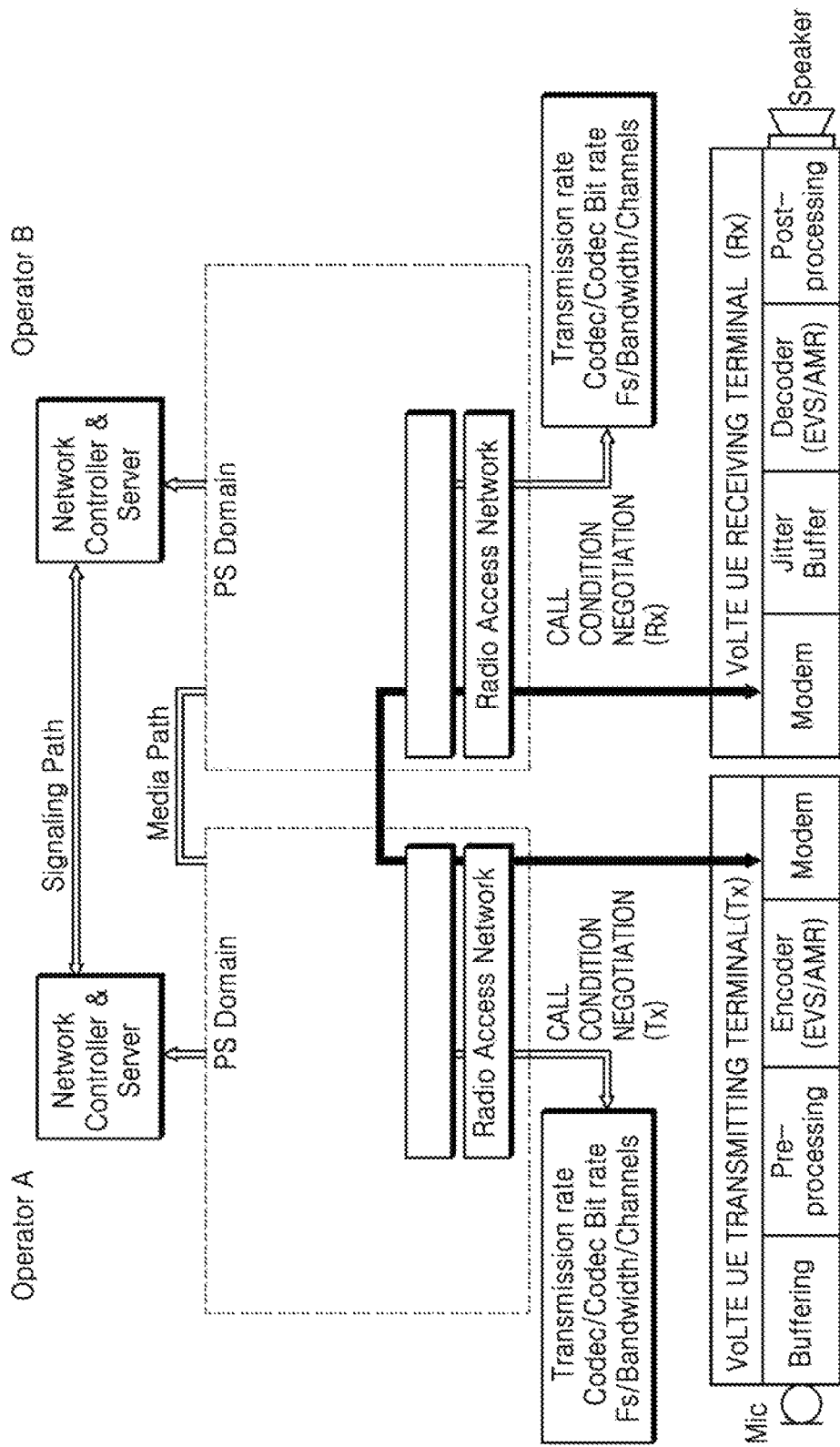
FIG. 1 illustrates a configuration of transmitting and receiving terminals and a packet network for a voice call.

As the present disclosure allows for various changes and numerous embodiments, particular embodiments will be illustrated in the drawings and described in detail in the written description. However, this is not intended to limit the present disclosure to particular embodiments, and it is to be appreciated that all changes, equivalents, and substitutes that do not depart from the spirit and technical scope of the present disclosure are encompassed in the present disclosure. In the description of embodiments, certain detailed explanations of related art are omitted when it is deemed that they may unnecessarily obscure the essence of the present disclosure.

While such terms as "first," "second," etc., may be used to describe various components, such components must not be limited to the above terms. The above terms are used only to distinguish one component from another.

Furthermore, all examples and conditional language recited herein are to be construed as being without limitation to such specifically recited examples and conditions. All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the present disclosure. Thus, the terms used herein have to be defined based on the meaning of the terms together with the description throughout the specification.

Throughout the specification, a singular form may include plural forms, unless there is a particular description contrary thereto. Also, terms "comprise", "include," or "have" are used to specify existence of a recited form, a number, a process, an operation, a component, and/or groups thereof, not excluding the existence of one or more other recited forms, one or more other numbers, one or more other processes, one or more other operations, one or more other components and/or groups thereof.

Hereinafter, embodiments will now be described more fully with reference to the accompanying drawings.

FIG. 1 illustrates a configuration of transmitting and receiving terminals and a packet network for a voice call. An example of the packet network using the configuration of FIG. 1 includes Long-Term Evolution (LTE), and a packet-based voice call service in an LTE network is Voice over Long-Term Evolution (VoLTE).

In general, in order to enable a voice call, a call condition negotiation process may precede via a signalling path between a transmitting end and a receiving end in a network structure consisting of a network of a transmitting terminal and Operator A to which the transmitting terminal accesses and a network of a receiving terminal and Operator B to which the receiving terminal accesses. In the call condition negotiation process, at least one of a transmission rate, codec, a codec bit-rate, a sampling frequency (also referred to as Fs), a bandwidth, and the number of channels. The transmission rate may denote an amount of data of a communication channel required for actual transmission, and the codec may denote a name of voice codec that is actually used. Examples of the codec may include Adaptive Multi-Rate (AMR), AMR-Wideband (AMR-WB), Enhanced Voice Services (EVS), or the like. The codec bit-rate may denote a bit-rate to be used in determined codec, and a voice signal may be compressed based on a negotiated codec bit-rate and compressed data may be transmitted to the receiving terminal via the packet network. Each codec may consist of a plurality of modes having various bit-rates, and respective bit-rates used in the modes may be predefined. The sampling frequency denotes a sampling frequency of an encoder input signal or a decoder output signal of the codec. The bandwidth denotes a bandwidth of a signal, and unlike the sampling frequency, the bandwidth indicates a bandwidth where coding is actually performed. Examples of a signal band supported by EVS codec include a narrowband (NB) ranging from 20 hertz (Hz) to 4,000 Hz, a wideband (WB) ranging from 20 Hz to 8,000 Hz, a super wideband (SWB) ranging from 20 Hz to 16,000 Hz, and a full-band (FB) ranging from 20 Hz to 20,000 Hz, and actual coding is available in a bandwidth lower than a band supported by each sampling frequency. For example, a band that can be supported by a sampling frequency of 32 kilohertz (kHz) includes FB, SWB, WB, and NB. The number of channels denotes the number of channels such as mono or stereo which are supported by a signal to be encoded or a decoded signal.

When the call condition negotiation process is completed, encoding may be performed in the transmitting terminal and decoding may be performed in the receiving terminal, based on a call condition. A bitstream that is generated as a result of the encoding may be transmitted to the receiving terminal via a media path. In a VoLTE service, data compressed in a transmitting terminal may be wirelessly transmitted to a Radio Access Network (RAN), and after the RAN, transmission to an operator of the other party may be achieved via a packet switched (PS) domain in a wired manner. An operator used by a receiving terminal may be equal to or different from an operator used by the transmitting terminal.

Figure 2:
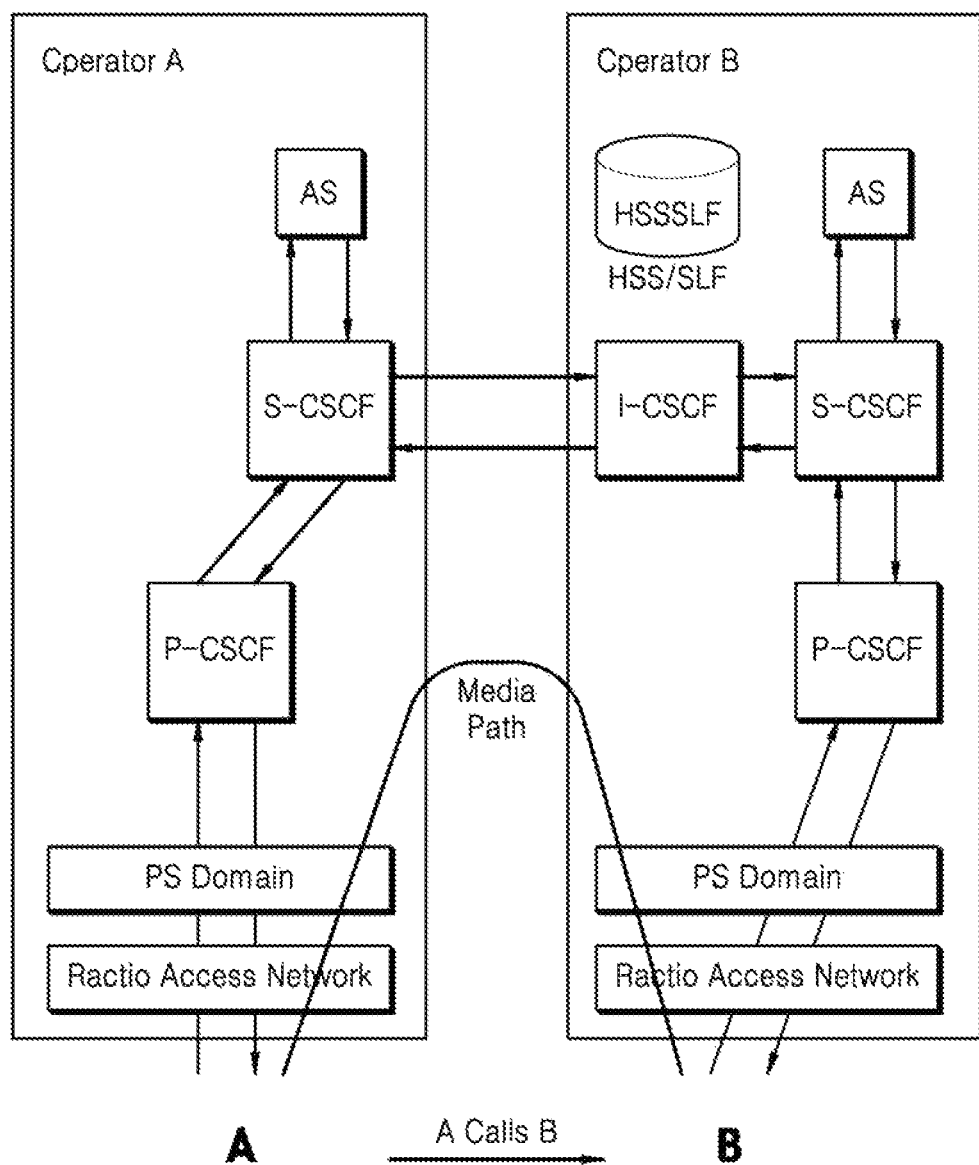
FIG. 2 illustrates an example of a specific configuration of transmitting and receiving terminals and a packet network for a voice call and an example of parameters used in negotiation in a packet network.

FIG. 2 illustrates an example of a specific configuration of transmitting and receiving terminals and a packet network for a voice call and an example of parameters used in negotiation in a packet network.

Referring to FIG. 2, terminal A negotiates a call condition with terminal B of the other party via Internet Protocol Multimedia Subsystem (IMS), and in this process, terminal B checks a Session Description Protocol (SDP) offer from terminal A and notifies a preferred call condition as an SDP answer. When the call condition negotiation process is completed, compressed media data is transmitted and received between terminals.

A code below corresponds to an example in which terminal A specifies a bit-rate (br) to range from 5.9 kilobits per second (kbps) to 48 kbps but does not particularly specify a bandwidth (bw), and offers to use a band that is fully available from NB to FB. According to an embodiment, codec having a priority in negotiation is EVS, and when the other party does not support EVS, the negotiation may proceed with respect to AMR-WB. EVS/16000/1 may respectively indicate Codec/sampling frequency/Number of channel, meaning that a call based on EVS codec, a sampling frequency of 16,000 Hz, and 1 channel, i.e., mono, is negotiated m=audio 49152 RTP/AVP 98 99
    b=AS:65
    b=RS:0
    b=RR:2000
    a=rtpmap: 98 EVS/16000/1
    a=fmtp:98 br=5.9-48
    a=rtpmap: 99 AMR-WB/16000/1
    a=ptime:20
    a=maxtime:80

A code below corresponds to an example in which terminal B replies that a bit-rate (br) is to range from 13.2 kbps to 24.4 kbps and a bandwidth (bw) ranging from NB to SWB is used for a call.

m=audio 49152 RTP/AVP 98
    b=AS:42
    b=RS:0
    b=RR:2000
    a=rtpmap: 98 EVS/16000/1
    a=fmtp:98 br=13.2-24.4; bw=nb-swb
    a=ptime:20
    a=maxtime:80

Figure 3:
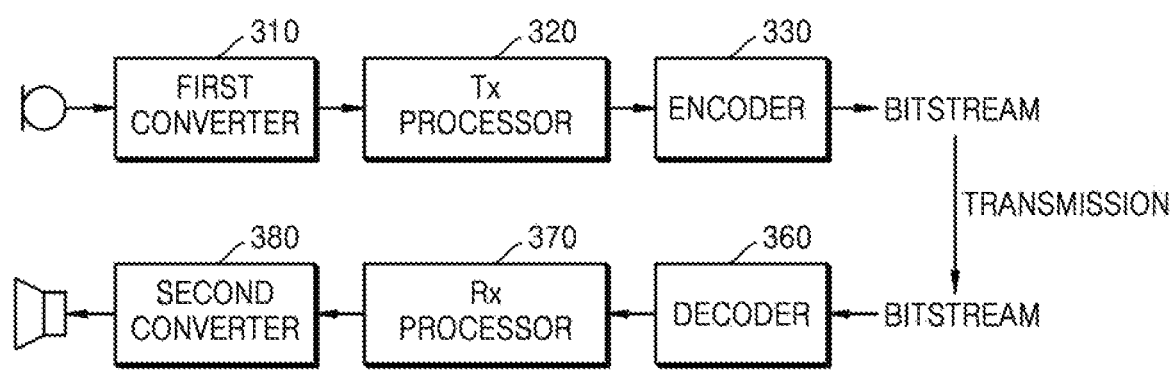
FIG. 3 is a block diagram illustrating a configuration of transmitting and receiving apparatuses for a voice call.

FIG. 3 is a block diagram illustrating a configuration of transmitting and receiving apparatuses for a voice call.

The apparatuses illustrated in FIG. 3 consist of a transmitting module and a receiving module. The transmitting module may include a first converter 310, a Tx processor 320, and an encoder 330, and the receiving module may include a decoder 360, an Rx processor 370, and a second converter 380. Elements in the transmitting module and/or the receiving module may be integrally embodied as at least one processor except for a case in which any one of the elements is to be embodied as separate hardware. The transmitting module and the receiving module may be respectively arranged at a transmitting part and a receiving part of a user equipment.

Referring to FIG. 3, the first converter 310 may convert an analog signal that is input via an input device such as a microphone to a digital signal.

The Tx processor 320 may perform various kinds of signal processing on the digital signal provided from the first converter 310. Examples of the signal processing may include, but are not limited to, noise removal, echo reduction, or the like.

The encoder 330 may perform, by using determined codec, encoding on a signal provided from the Tx processor 320. A bitstream that is generated as the encoding result may be transmitted to a receiver via a transmission channel, or may be stored in a storage medium and then may be transmitted for next decoding.

The decoder 360 may perform decoding on the received bitstream by using determined codec.

The Rx processor 370 may perform various kinds of signal processing on a decoded signal. Examples of the signal processing may include, but are not limited to, noise removal, echo reduction, or the like.

The second converter 380 may convert a signal provided from the reception processor 370 to an analog signal. The analog signal provided from the second converter 380 may be reproduced via a speaker or a receiver.

An example of the codec used with reference to FIG. 3 may include EVS.

Figure 4:
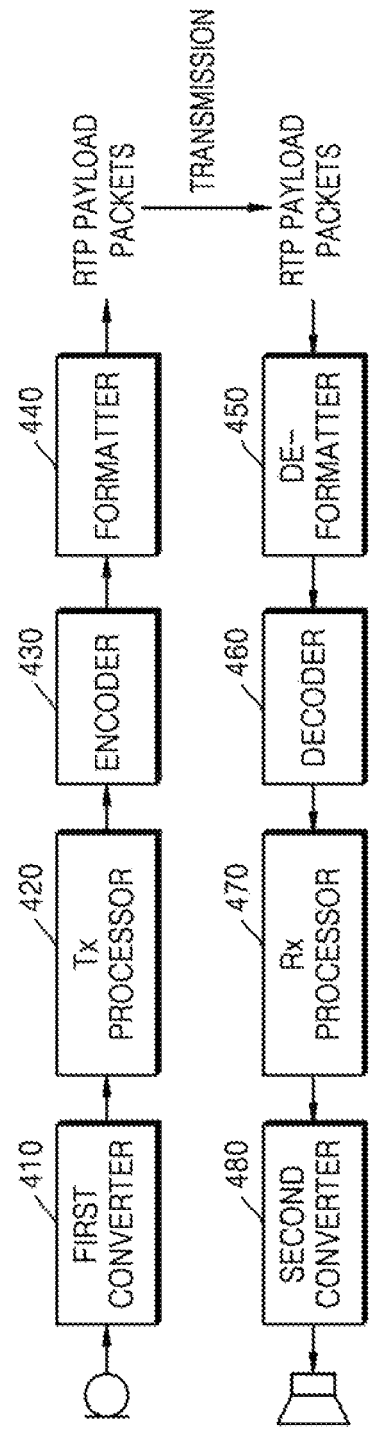
FIG. 4 is a block diagram illustrating a configuration of transmitting and receiving apparatuses for a voice call in a packet network.

FIG. 4 is a block diagram illustrating a configuration of transmitting and receiving apparatuses for a voice call in a packet network.

The apparatuses illustrated in FIG. 4 consist of a transmitting module and a receiving module. The transmitting module may include a first converter 410, a Tx processor 420, an encoder 430, and a formatter 440, and the receiving module may include a de-formatter 450, a decoder 460, an Rx processor 470, and a second converter 480. Elements in the transmitting module and/or the receiving module may be integrally embodied as at least one processor except for a case in which any one of the elements is to be embodied as separate hardware. The transmitting module and the receiving module may be respectively arranged at a transmitting part and a receiving part of a user equipment. Because the apparatuses illustrated in FIG. 4 share the elements illustrated in FIG. 3, except for the formatter 440, the de-formatter 450, and the decoder 460, redundant operation descriptions thereof are omitted here.

Referring to FIG. 4, the formatter 440 may perform formatting on a bitstream provided from the encoder 430, thereby generating a Real-time Transport Protocol (RTP) payload packet for communication in the packet network. The RTP payload packet generated by the formatter 440 may be transmitted to a receiver via a transmission channel, or may be stored in a storage medium and then may be transmitted for next decoding.

The de-formatter 450 may perform de-formatting on the received RTP payload packet and thus may extract necessary information. Examples of the necessary information may include timestamp information, packet loss information, an EVS bitstream, or the like.

The decoder 460 including a jitter buffer management (JBM) unit may offset a network jitter by using the information extracted by the de-formatter 450, and then may perform decoding processing.

An example of codec used with reference to FIG. 4 may include EVS.

Figure 5:
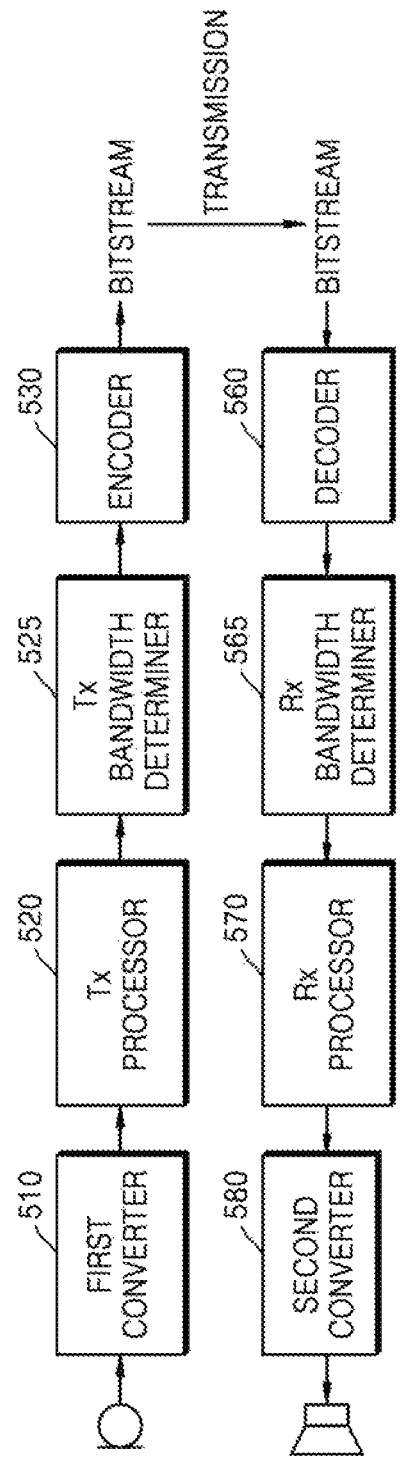
FIG. 5 is a block diagram illustrating a configuration of transmitting and receiving apparatuses for a voice call, according to an embodiment.

FIG. 5 is a block diagram illustrating a configuration of transmitting and receiving apparatuses for a voice call, according to an embodiment.

The apparatuses illustrated in FIG. 5 consist of a transmitting module and a receiving module. The transmitting module may include a first converter 510, a Tx processor 520, a Tx bandwidth determiner 525, and an encoder 530, and the receiving module may include a decoder 560, an Rx bandwidth determiner 565, an Rx processor 570, and a second converter 580. Elements in the transmitting module and/or the receiving module may be integrally embodied as at least one processor except for a case in which any one of the elements is to be embodied as separate hardware. The transmitting module and the receiving module may be respectively arranged at a transmitting part and a receiving part of a user equipment.

Referring to FIG. 5, the first converter 510 may convert an analog signal provided via an input device such as a microphone to a digital signal.

The Tx processor 520 may perform various kinds of signal processing on the digital signal provided from the first converter 510. Examples of the signal processing may include, but are not limited to, noise removal, echo reduction, or the like.

The Tx bandwidth determiner 525 may search for optimal encoding bandwidths by using a signal provided from the Tx processor 520, and may determine an encoding bandwidth, based on the search result. Codec may be controlled based on the encoding bandwidth determined by the Tx bandwidth determiner 525. According to an embodiment, a maximum encoding bandwidth may be determined based on the search result, and a maximum encoding band may be limited by using a codec parameter. According to another embodiment, a signal in a band higher than a corresponding cut-off frequency may be removed by performing low-pass filtering based on the search result. According to another embodiment, the maximum encoding bandwidth and a minimum encoding bandwidth may be determined based on the search result, and the encoder 530 may be controlled to perform encoding in an exactly desired band. According to the embodiment, determination of a bandwidth may be performed in units of a plurality of frames, a unit of a frame, units of a plurality of sub-frames, or a unit of a sub-frame.

The encoder 530 may perform encoding on the signal provided from the Tx processor 520, by using preset codec, based on the bandwidth determined by the Tx bandwidth determiner 525. A bitstream that is generated as the encoding result may be transmitted to a receiver via a transmission channel, or may be stored in a storage medium and then may be transmitted for next decoding.

The decoder 560 may perform decoding on the received bitstream by using the preset codec.

The Rx bandwidth determiner 565 may search for optimal decoding bandwidths by using a signal provided from the decoder 560, and may determine a decoding bandwidth, based on the search result. Sound quality of a signal may be enhanced, the signal being decoded based on the optimal decoding bandwidth determined by the Rx bandwidth determiner 565.

The Rx processor 570 may perform various kinds of signal processing on the decoded signal, based on the optimal decoding bandwidth determined by the Rx bandwidth determiner 565. Examples of the signal processing may include, but are not limited to, low-pass filtering, bandwidth extension, or the like.

The second converter 580 may convert a signal provided from the Rx processor 570 to an analog signal. The analog signal provided from the second converter 580 may be reproduced by a speaker or a receiver.

Figure 6:
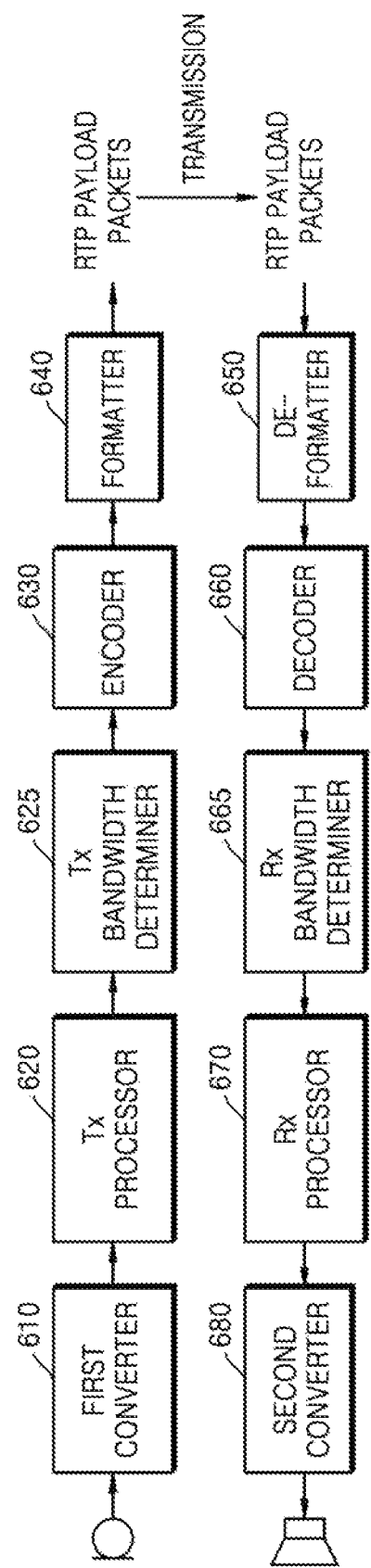
FIG. 6 is a block diagram illustrating a configuration of transmitting and receiving apparatuses for a voice call in a packet network, according to an embodiment.

FIG. 6 is a block diagram illustrating a configuration of transmitting and receiving apparatuses for a voice call in a packet network, according to an embodiment.

The apparatuses illustrated in FIG. 6 consist of a transmitting module and a receiving module. The transmitting module may include a first converter 610, a Tx processor 620, a Tx bandwidth determiner 625, an encoder 630, and a formatter 640, and the receiving module may include a de-formatter 650, a decoder 660, an Rx bandwidth determiner 665, an Rx processor 670, and a second converter 680. Elements in the transmitting module and/or the receiving module may be integrally embodied as at least one processor except for a case in which any one of the elements is to be embodied as separate hardware. The transmitting module and the receiving module may be respectively arranged at a transmitting part and a receiving part of a user equipment. Because the apparatuses illustrated in FIG. 6 share the elements illustrated in FIG. 5, except for the formatter 640, the de-formatter 650, and the decoder 660, redundant operation descriptions thereof are omitted here.

Referring to FIG. 6, the formatter 640 may perform formatting on a bitstream provided from the encoder 630, thereby generating a RTP payload packet for communication in the packet network. The RTP payload packet generated by the formatter 640 may be transmitted to a receiver via a transmission channel, or may be stored in a storage medium and then may be transmitted for next decoding.

The de-formatter 650 may perform de-formatting on the received RTP payload packet and thus may extract necessary information. Examples of the necessary information may include timestamp information, packet loss information, an EVS bitstream, or the like.

The decoder 660 including a JBM unit may offset a network jitter by using the information extracted by the de-formatter 650, and then may perform decoding processing.

Figure 7:
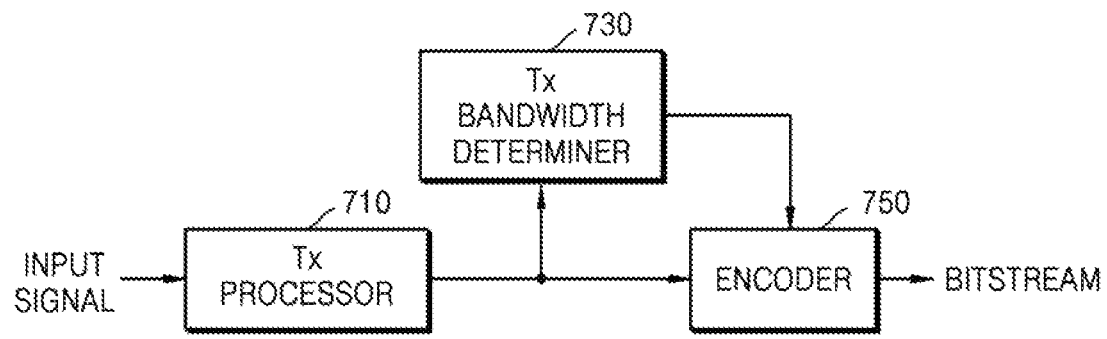
FIG. 7 is a block diagram illustrating a configuration of a transmitting apparatus, according to an embodiment.

FIG. 7 is a block diagram illustrating a configuration of a transmitting apparatus, according to an embodiment.

The apparatus illustrated in FIG. 7 may include a Tx processor 710, a Tx bandwidth determiner 730, and an encoder 750.

Referring to FIG. 7, the Tx processor 710 may perform various kinds of processing on an input signal. The processing performed by the Tx processor 710 may include, but is not limited to, filtering processing, echo removal processing, noise reduction processing, equalization processing, automatic gain control processing, or the like, and may perform at least one kind of processing. An example of the filtering processing may include high-pass filtering.

The Tx bandwidth determiner 730 may determine an optimal encoding bandwidth of a signal provided from the Tx processor 710. To do so, the Tx bandwidth determiner 730 may receive a sampling frequency and an encoding bit-rate determined via a call condition negotiation process between terminals. The optimal encoding bandwidth may be classified to NB (~4 kHz), WB (~8 kHz), SWB (~16 kHz), and FB (~20 kHz), and each bandwidth may be additionally defined with respect to sub-bandwidths to have a high degree of precision. For example, SWB may be defined with respect to sub-bandwidths of 10, 12, and 14 kHz.

The encoder 750 may perform encoding on the signal provided from the Tx processor 710, based on the encoding bandwidth determined by the Tx bandwidth determiner 730.

Figure 8:
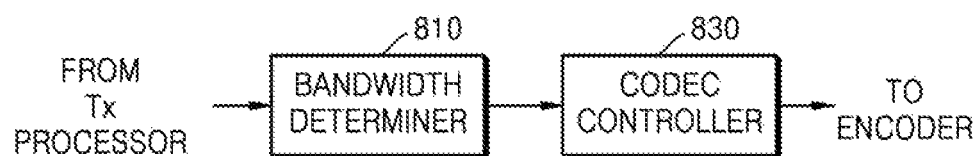
FIG. 8 is a block diagram illustrating a configuration of a transmission bandwidth determiner illustrated in FIG. 7.

FIG. 8 is a block diagram illustrating a configuration of a Tx bandwidth determiner illustrated in FIG. 7.

The Tx bandwidth determiner illustrated in FIG. 8 may include a bandwidth determiner 810 and a codec controller 830.

Referring to FIG. 8, the bandwidth determiner 810 may determine an encoding bandwidth of a signal, based on a sampling frequency and an encoding bit-rate.

The codec controller 830 may control codec, e.g., the encoder 750 (refer to FIG. 7), based on the encoding bandwidth determined by the bandwidth determiner 810. According to an embodiment, the codec controller 830 may define a maximum bandwidth of the codec, and may limit the maximum bandwidth, based on the determined encoding bandwidth. In the case where employed codec is EVS codec, the maximum bandwidth may be limited by using MAX_BAND switch. According to another embodiment, the codec controller 830 may define a maximum bandwidth and a minimum bandwidth of codec, and may select a desired encoding band based on the encoding bandwidth determined by the bandwidth determiner 810. In the case where employed codec is the EVS codec, the minimum bandwidth may be limited by adding MIN_BAND switch. For example, in the case where MAX_BAND is SWB and MIN_BAND is NB, the EVS codec may perform encoding only in NB, WB, and SWB. As another example, in the case where MAX_BAND is SWB and MIN_BAND is SWB, the EVS codec may perform encoding only in SWB.

Figure 9:
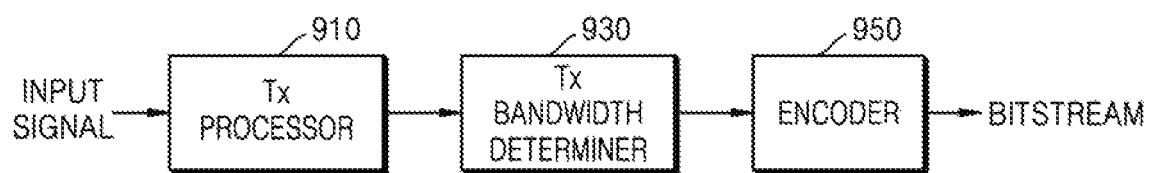
FIG. 9 is a block diagram illustrating a configuration of a transmitting apparatus, according to another embodiment.

FIG. 9 is a block diagram illustrating a configuration of a transmitting apparatus, according to another embodiment.

The apparatus illustrated in FIG. 9 may include a Tx processor 910, a Tx bandwidth determiner 930, and an encoder 950.

Referring to FIG. 9, the Tx processor 910 may perform an operation equal or similar to that of the Tx processor 710 of FIG. 7.

The Tx bandwidth determiner 930 may determine an encoding bandwidth of a signal provided from the transmission processor 910, based on a sampling frequency and an encoding bit-rate determined via a call condition negotiation process between terminals. The Tx bandwidth determiner 930 may determine whether to perform pre-processing, based on a result of comparing the determined encoding bandwidth and a maximum bandwidth supported by the sampling frequency, may process the signal provided from the Tx processor 910, in response to the determination result, and may provide the signal to the encoder 950.

The encoder 950 may perform encoding on the signal provided from the Tx bandwidth determiner 930, based on the encoding bandwidth determined by the Tx bandwidth determiner 930.

Figure 10:
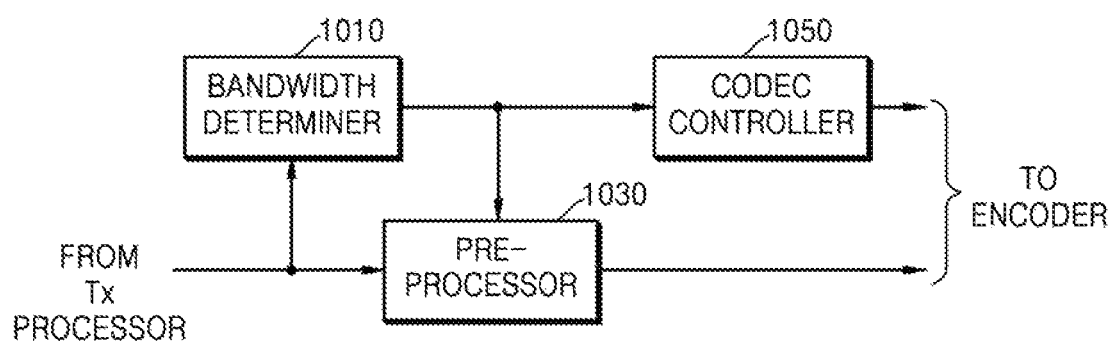
FIG. 10 is a block diagram illustrating a configuration of a transmission bandwidth determiner illustrated in FIG. 9.

FIG. 10 is a block diagram illustrating a configuration of a Tx bandwidth determiner illustrated in FIG. 9.

The Tx bandwidth determiner illustrated in FIG. 10 may include a bandwidth determiner 1010, a pre-processor 1030, and a codec controller 1050.

Referring to FIG. 10, the bandwidth determiner 1010 may determine an encoding bandwidth of a signal, based on a sampling frequency and an encoding bit-rate.

In the case where the encoding bandwidth determined by the bandwidth determiner 1010 is equal to a maximum bandwidth supported by the sampling frequency, the pre-processor 1030 may provide a signal provided from the transmission processor 910 to the encoder 950, without additional processing thereto. In the case where the encoding bandwidth determined by the transmission bandwidth determiner 930 is different from the maximum bandwidth supported by the sampling frequency, the pre-processor 1030 may perform pre-processing such as low-pass filtering or bandwidth extension on the signal provided from the transmission processor 910, and may provide the pre-processed signal to the encoder 950.

The codec controller 1050 may control codec, e.g., the encoder 950 (refer to FIG. 9), based on the encoding bandwidth determined by the bandwidth determiner 1010. The codec controller 1050 may perform an operation equal or similar to that of the codec controller 830 of FIG. 8.

The pre-processor 1030 and the codec controller 1050 may be implemented as one module, and in this case, the signal provided from the Tx processor 910 may be pre-processed and then may be limited with respect to the maximum bandwidth. Also, only one of the pre-processor 1030 and the codec controller 1050 may be used, or the pre-processor 1030 and the codec controller 1050 may simultaneously operate.

A high frequency band may be separately reconstructed with respect to a frequency band where the encoding bandwidth determined via the bandwidth extension processing by the pre-processor 1030 is lower than a bandwidth supported by the received sampling frequency.

The low-pass filtering processing available in the pre-processor 1030 may vary according to received sampling frequencies. A summary thereof is in Table 1 below.

TABLE 1

| Sampling Frequency | Supporting Bandwidth | Low-Pass Filter (LPF) |
|---|---|---|
| 16 kHz | NB, WB | 4 kHz (NB) LPF |
| 32 kHz | NB, WB, SWB | 4 kHz (NB), 8 kHz (WB) LPF 9, 10, 11, 12, 13, 14, 15 kHz LPF |
| 48 kHz | NB, WB, SWB, FB | 4 kHz (NB), 8 kHz (WB) LPF 9, 10, 11, 12, 13, 14, 15, 16, 17, 18, 19 kHz LPF |

Referring to Table 1, a filter in a unit of 1 kHz may be designed with respect to SWB and FB. When a sampling frequency of 16 kHz is used, a LPF that supports WB is not required. As a used sampling frequency is changed, it is also necessary to change a filter to be used. In this regard, in order to provide a similar response, the number of taps of a filter or coefficients of the filter may be necessarily adjusted.

Figure 11:
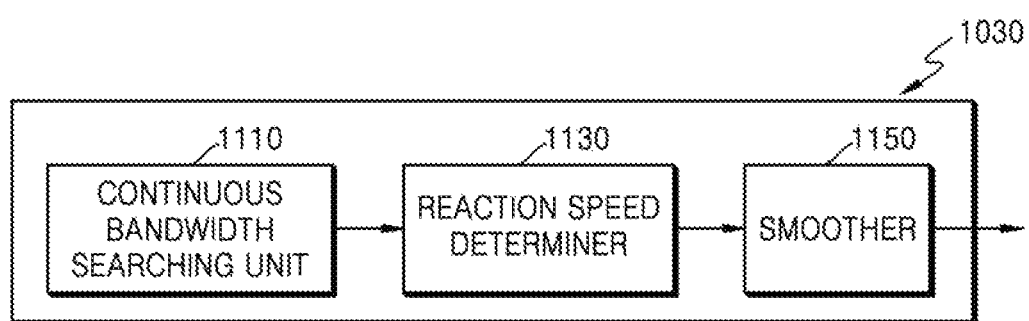
FIG. 11 is a block diagram illustrating a configuration of a pre-processor illustrated in FIG. 10, according to an embodiment.

FIG. 11 is a block diagram illustrating a configuration of a pre-processor illustrated in FIG. 10, according to an embodiment.

The pre-processor 1030 illustrated in FIG. 11 may include a continuous bandwidth searching unit 1110, a reaction speed determiner 1130, and a smoother 1150.

Referring to FIG. 11, the continuous bandwidth searching unit 1110 may achieve the number of continuous frames having a same band.

The reaction speed determiner 1130 may determine when information about a determined band is actually used as an output from the pre-processor 1030. When an output from the continuous bandwidth searching unit 1110 exceeds a preset threshold, a band determined by the continuous bandwidth searching unit 1110 may be actually used as the output from the pre-processor 1030. When it is not, the output is smoothing-processed by the smoother 1150 and then is output, and an output result thereof may be used as the output from the pre-processor 1030.

The smoother 1150 may perform smoothing to allow a change in a selected bandwidth to slowly proceed.

Figure 12:
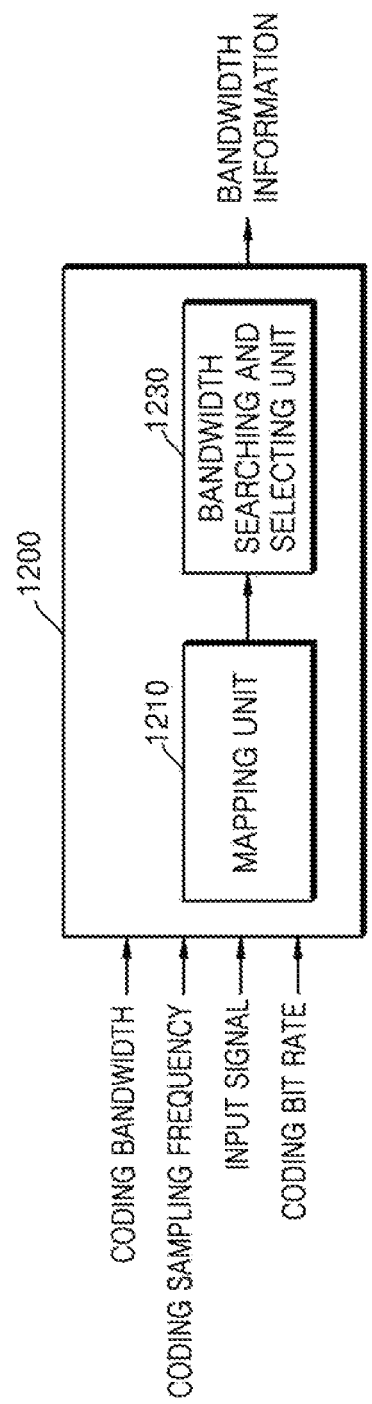
FIG. 12 is a block diagram illustrating a configuration of a bandwidth determiner illustrated in FIG. 8 or 10, according to an embodiment.

FIG. 12 is a block diagram illustrating a configuration of a bandwidth determiner illustrated in FIG. 8 or 10, according to an embodiment.

A bandwidth determiner 1200 illustrated in FIG. 12 may include a mapping unit 1210 and a bandwidth searching and selecting unit 1230.

Referring to FIG. 12, the mapping unit 1210 may convert a time-domain signal to a frequency-domain signal, based on time-frequency mapping processing. An example of the time-frequency mapping processing may include, but is not limited to, a fast Fourier transform (FFT), a complex modulated low delay filter bank (CLDFB), a discrete cosine transform (DCT), or the like.

The bandwidth searching and selecting unit 1230 may determine an optimal encoding bandwidth for the frequency-domain signal provided from the mapping unit 1210. To do so, first, the frequency-domain signal may be divided into predefined band units, and the optimal encoding bandwidth may be detected based on energy of each of bands. The energy of each band may be compared with a predefined threshold value, and the optimal encoding bandwidth may be detected based on the comparison result. In this regard, a size of each band may vary according to a degree of precision in processing of encoding bandwidth determination, or resolution. The bandwidth searching and selecting unit 1230 may select a desired encoding bandwidth for an input signal by using a result of detecting the optimal encoding bandwidth, and may output bandwidth information. The desired encoding bandwidth may be selected in consideration of not only an input encoding bandwidth and an input sampling frequency but also an encoding bit-rate. A summary thereof is in Table 2 below.

TABLE 2

| Bandwidth | Source Bandwidth (Hz) | Supporting Sampling Frequency (kHz) | Bit-rate (kbps) |
| --- | --- | --- | --- |
| NB | 20~4,000 | 8/16/32/48 | 5.9, 7.2, 8, 9.6, 13.2, 16.4, 24.4 |
| WB | 20~8,000 | 16/32/48 | 5.9, 7.2, 8, 9.6, 13.2, 16.4, 24.4, 32, 48, 64, 96, 128 |
| SWB | 20~16,000 | 32/48 | 9.6, 13.2, 16.4, 24.4, 32, 48, 64, 96, 128 |
| FB | 20~20,000 | 48 | 16.4, 24.4, 32, 48, 64, 96, 128 |

Referring to Table 2, in a case of EVS codec, an encoding bit-rate may vary according to each bandwidth. That is, when a bandwidth that is not supported by a current bit-rate is selected, in consideration of an encoding bit-rate, the bandwidth may be changed to an upper bandwidth that is supported.

In addition, the bandwidth searching and selecting unit 1230 may perform smoothing processing on the selected encoding bandwidth. By doing so, sound quality deterioration due to a sharp change or frequent changes in the encoding bandwidth may be minimized. For the smoothing processing, a hysteresis, a moving average, or a hangover may be used.

Figure 13:
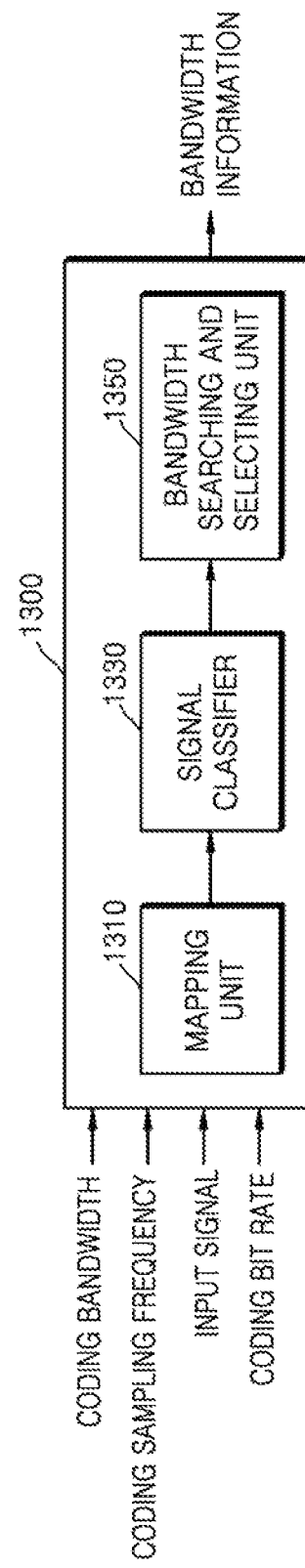
FIG. 13 is a block diagram illustrating a configuration of a bandwidth determiner illustrated in FIG. 8 or 10, according to another embodiment.

FIG. 13 is a block diagram illustrating a configuration of a bandwidth determiner illustrated in FIG. 8 or 10, according to another embodiment.

A bandwidth determiner 1300 illustrated in FIG. 13 may include a mapping unit 1310, a signal classifier 1330, and a bandwidth searching and selecting unit 1350.

Referring to FIG. 13, the mapping unit 1310 may perform an operation equal or similar to that of the mapping unit 1210 of FIG. 12.

The signal classifier 1330 may perform signal classification on a frequency-domain signal provided from the mapping unit 1310, and thus may classify the signal as one of a voice signal and a music signal.

The bandwidth searching and selecting unit 1350 may select an optimal encoding bandwidth for the frequency-domain signal provided from the mapping unit 1310, according to the classification result from the signal classifier 1330. The bandwidth searching and selecting unit 1350 may select an encoding bandwidth, in consideration of a signal characteristic, by using different threshold values according to the classification result from the signal classifier 1330. Except for the threshold values, the bandwidth searching and selecting unit 1350 may perform an operation equal or similar to that of the bandwidth searching and selecting unit 1230 of FIG. 12.

Figure 14:
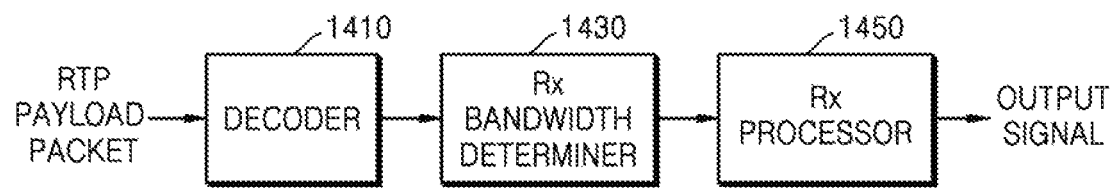
FIG. 14 is a block diagram illustrating a configuration of a receiving apparatus, according to an embodiment.

FIG. 14 is a block diagram illustrating a configuration of a receiving apparatus, according to an embodiment.

The apparatus illustrated in FIG. 14 may include a decoder 1410, an Rx bandwidth determiner 1430, and an Rx processor 1450.

Referring to FIG. 14, the decoder 1410 including a JBM unit may analyze a transmitted RTP payload packet and may determine an optimal playout delay. The decoder 1410 may perform, by using predetermined codec, decoding on the RTP payload packet according to the determined playout delay. In the case where a packet network is not used, a bitstream, instead of the RTP payload packet, may be used as an input.

The Rx bandwidth determiner 1430 may search for an optimal decoding bandwidth by using a signal decoded by the decoder 1410, based on a sampling frequency, and may determine a decoding bandwidth, based on the searching result. Sound quality of the decoded signal may be enhanced based on the decoding bandwidth determined by the Rx bandwidth determiner 1430. The sampling frequency may be determined via a call condition negotiation process between terminals.

The Rx processor 1450 may perform various kinds of signal processing on the decoded signal, based on the decoding bandwidth determined by the Rx bandwidth determiner 1430. Examples of the signal processing may include, but are not limited to, filtering processing, gain control processing, or the like.

Figure 15:
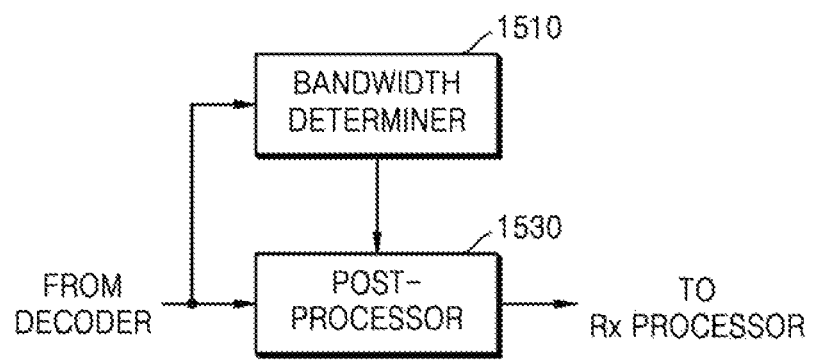
FIG. 15 is a block diagram illustrating a configuration of a receiver bandwidth determiner illustrated in FIG. 14.

FIG. 15 is a block diagram illustrating a configuration of an Rx bandwidth determiner illustrated in FIG. 14.

The Rx bandwidth determiner illustrated in FIG. 15 may include a bandwidth determiner 1510 and a post-processor 1530.

Referring to FIG. 15, the bandwidth determiner 1510 may determine a decoding bandwidth of a signal, based on a sampling frequency.

When the decoding bandwidth determined by the bandwidth determiner 1510 is equal to a maximum bandwidth supported by a sampling frequency, the post-processor 1530 may provide the signal decoded by the decoder 1410 to the reception processor 1450, without additional processing thereto. When the decoding bandwidth determined by the bandwidth determiner 1510 is different from the maximum bandwidth supported by the sampling frequency, the post-processor 1530 may perform post-processing such as low-pass filtering or bandwidth extension on the signal decoded by the decoder 1410 and may provide the post-processed signal to the Rx processor 1450. Due to bandwidth extension processing, a high frequency band may be reconstructed with respect to a frequency band signal where a determined optimal bandwidth is lower than a bandwidth supported by an input sampling frequency.

Figure 16:
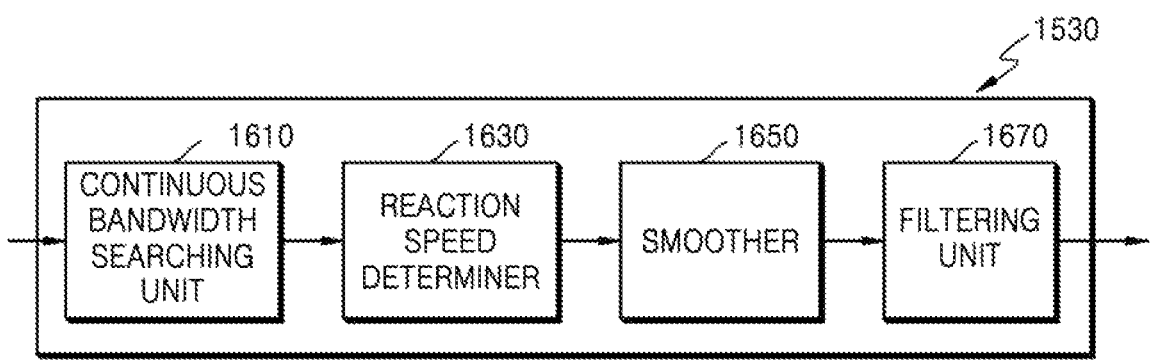
FIG. 16 is a block diagram illustrating a configuration of a post-processor illustrated in FIG. 15, according to an embodiment.

FIG. 16 is a block diagram illustrating a configuration of a post-processor illustrated in FIG. 15, according to an embodiment.

The post-processor 1530 illustrated in FIG. 16 may include a continuous bandwidth searching unit 1610, a reaction speed determiner 1630, a smoother 1650, and a filtering unit 1670.

Referring to FIG. 16, the continuous bandwidth searching unit 1610 and the reaction speed determiner 1630 are substantially equal to the continuous bandwidth searching unit 1110 and the reaction speed determiner 1130 illustrated in FIG. 11.

Unlike the pre-processor 1030, the smoother 1650 allows a change in a selected bandwidth to fast proceed.

The filtering unit 1670 may consist of one or more LPFs and may perform low-pass filtering on an output from the smoother 1650. The filters may have different 3 decibel (dB) cut-off frequencies and roll-down curves, and may perform low-pass filtering by using a selected filter.

Figure 17:
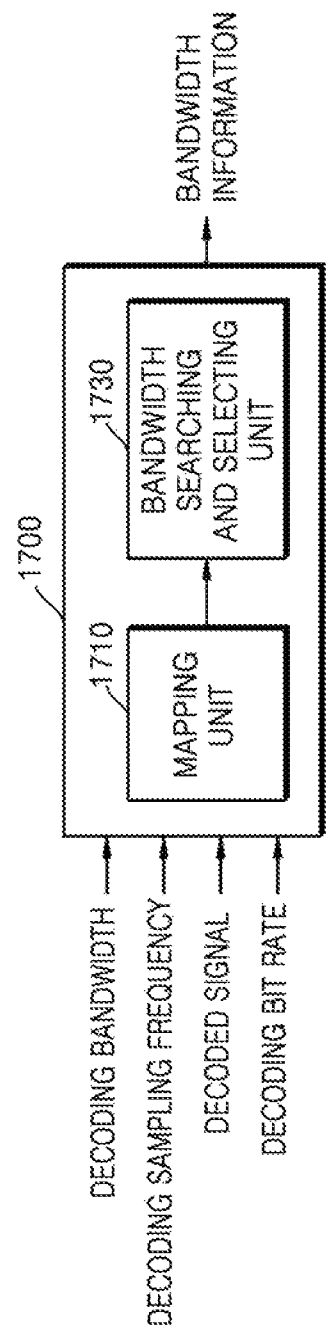
FIG. 17 is a block diagram illustrating a configuration of a bandwidth determiner illustrated in FIG. 16, according to an embodiment.

FIG. 17 is a block diagram illustrating a configuration of a bandwidth determiner illustrated in FIG. 16, according to an embodiment.

A bandwidth determiner 1700 illustrated in FIG. 16 may include a mapping unit 1710 and a bandwidth searching and selecting unit 1730.

Referring to FIG. 17, the mapping unit 1710 may convert a time-domain signal to a frequency-domain signal, based on time-frequency mapping processing. An example of the time-frequency mapping processing may include, but is not limited to, a FFT, a CLDFB, a DCT, or the like.

The bandwidth searching and selecting unit 1730 may generate optimal bandwidth information for the frequency-domain signal provided from the mapping unit 1710. To do so, decoding parameters used in decoding are required. The decoding parameters may be a decoding bandwidth, a decoding sampling frequency, and a decoding bit-rate. The decoding bandwidth, the decoding sampling frequency, and the decoding bit-rate may be determined via a call condition negotiation process between terminals. The bandwidth searching and selecting unit 1730 may select an optimal bandwidth for the frequency-domain signal provided from the mapping unit 1710, based on the decoding parameters. The optimal bandwidth may be selected to be equal to or less than a bandwidth supported by the decoding sampling frequency. For example, when the decoding sampling frequency is 48 kHz, one of NB, WB, SWB, and FB may be selected, and when the decoding sampling frequency is 32 kHz, one of NB, WB, and SWB may be selected. Whether to search for the optimal bandwidth may be determined based on the decoding bit-rate. A process of search for the optimal bandwidth may be omitted with respect to a bit-rate higher than a reference value, and may be applied to a bit-rate lower than the reference value. An example of the reference value may be 13.2 kbps. For example, when an input bit-rate of EVS codec is equal to or less than 13.2 kbps, the process of search for the optimal bandwidth may be performed, and for cases other than that, the process of search for the optimal bandwidth may be omitted. In the case where the decoding sampling frequency is SWB but an actual decoding bandwidth is NB, the process of search for the optimal bandwidth is omitted. That is, the process of search for the optimal bandwidth may be performed when the actual decoding bandwidth is greater than NB.

The bandwidth searching and selecting unit 1730 may determine the optimal bandwidth for the frequency-domain signal provided from the mapping unit 1710. To do so, first, the frequency-domain signal may be divided into predefined band units, and the optimal decoding bandwidth may be detected based on energy of each of bands. The energy of each band may be compared with a predefined threshold value, and the optimal decoding bandwidth may be detected based on the comparison result. In this regard, a size of each band may vary according to a degree of precision in processing of decoding bandwidth determination, or resolution. Background noise and an active signal may be divided based on a value of an energy difference between a current frame and a previous frame, and the threshold value may be set according to the result therefrom. For example, a case in which a sharp change occurs in energy may be classified as the active signal having important information, and the optimal bandwidth may be searched for in consideration of the active signal. By doing so, the optimal bandwidth may be adaptively determined with respect to the background noise and the active signal in a noise environment. In addition, a desired actual bandwidth of a signal component may be selected from an input signal including the signal component and a noise component.

The bandwidth searching and selecting unit 1730 may perform smoothing processing on the selected bandwidth. This is to minimize sound quality deterioration due to a sharp change or frequent changes in the selected bandwidth. For the smoothing processing, a hysteresis, a moving average, or a hangover may be used.

Figure 18:
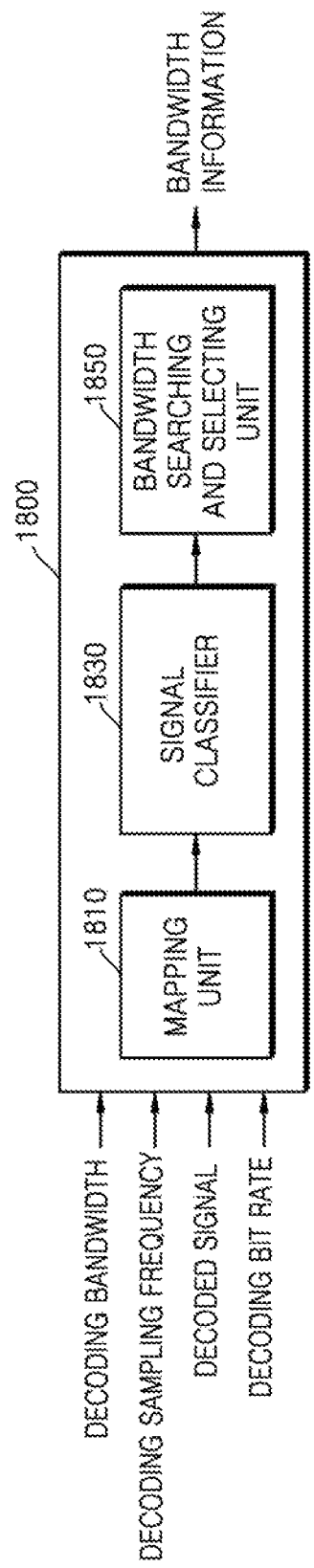
FIG. 18 is a block diagram illustrating a configuration of a bandwidth determiner illustrated in FIG. 16, according to another embodiment.

FIG. 18 is a block diagram illustrating a configuration of a bandwidth determiner illustrated in FIG. 16, according to another embodiment.

A bandwidth determiner 1800 illustrated in FIG. 18 may include a mapping unit 1810, a signal classifier 1830, and a bandwidth searching and selecting unit 1850.

Referring to FIG. 18, the mapping unit 1810 may perform an operation equal or similar to that of the mapping unit 1710 of FIG. 17.

The signal classifier 1830 may perform signal classification on a frequency-domain signal provided from the mapping unit 1810, and thus may classify the signal as one of a voice signal and a music signal. The bandwidth searching and selecting unit 1850 may select an optimal bandwidth for the frequency-domain signal provided from the mapping unit 1610, according to the classification result from the signal classifier 1830. The bandwidth searching and selecting unit 1850 may select the optimal bandwidth, in consideration of a signal characteristic, by using different threshold values according to the classification result from the signal classifier 1830. Except for the threshold values, the bandwidth searching and selecting unit 1850 may perform an operation equal or similar to that of the bandwidth searching and selecting unit 1730 of FIG. 17.

FIG. 17 is a flowchart for describing an operation of a pre-processor illustrated in FIGS. 10 and 11.

Referring to FIG. 17, in operation 1710, a speech input may be received.

In operation 1730, a bandwidth may be detected. According to an embodiment, operation 1730 may include a framing and windowing block, an FFT block, a band energy analyzing block, an active frame determining block, and a pre-processing deciding block. In this regard, a sampling frequency and a frame size of an input signal which are supported in the framing and windowing block and are substantially equal or similar to the aforementioned matter may be used. In the FFT block, a 256-point real-value FFT may be used, and as a result, a 128-point frequency coefficient may be generated.

In the band energy analyzing block, energy of each of bands may be calculated.

In the case of an input of a 32-kHz sampling frequency, the bands may be divided as shown in Table 3 below.

TABLE 3

| Band No. | Start | End |
|---|---|---|
| 1 | 1 | 63 |
| 2 | 64 | 71 |
| 3 | 72 | 79 |
| 4 | 80 | 87 |
| 5 | 88 | 95 |
| 6 | 96 | 103 |
| 7 | 104 | 111 |
| 8 | 112 | 119 |
| 9 | 120 | 128 |

In the case of an input of a 48-kHz sampling frequency, the bands may be divided as shown in Table 4 below.

TABLE 4

| Band No. | Start | End |
|---|---|---|
| 1 | 1 | 42 |
| 2 | 43 | 47 |
| 3 | 48 | 53 |
| 4 | 54 | 58 |
| 5 | 59 | 63 |
| 6 | 64 | 69 |
| 7 | 70 | 74 |
| 8 | 75 | 79 |
| 9 | 80 | 85 |
| 10 | 86 | 90 |
| 11 | 91 | 95 |
| 12 | 96 | 100 |
| 13 | 101 | 106 |
| 14 | 107 | 111 |
| 15 | 112 | 116 |
| 16 | 117 | 121 |
| 17 | 122 | 128 |

In the band energy analyzing block, energy of each of the bands is summed such that band energy may be obtained.

In the active frame determining block, whether a current frame is an active frame may be checked. The check may be performed via the aforementioned signal classification. When the current frame is the active frame, a pre-processing deciding process may be performed.

In the pre-processing deciding block, entire signal energy, i.e., a sum of all band energies, is compared with a pre-defined signal threshold value, and when the entire signal energy is less than the signal threshold value, a corresponding band may be set as a minimum bandwidth. An example of the signal threshold value may include, but is not limited to, 400,000. When the entire signal energy is greater than the signal threshold value, energy of each of the bands is expressed in the form of $Energy_{n,k}$, using a sub-frame $(_n)$ and a band $(_k)$. By using the value, $Speech_{n,k}$ that is a log ratio may be calculated according to Equation 1 below.

$$Speech_{n,k} = 10 \times \log_{10}(Energy_{n,k}/Energy_{n,1})$$ [Equation 1]

An increase in maximum band energy is defined as UP, a decrease in the maximum band energy is defined as DOWN, and then smoothed log energy $E_{n,k}$ may be calculated by using Equation 2 below.

$E_{n,k} = E_{n-1,k} + UP$, if $(Speech_{n,k} - E_{n-1,k} > UP)$ $E_{n,k} = E_{n-1,k} + DOWN$, if $(Speech_{n,k} - E_{n-1,k} < DOWN)$ $E_{n,k} = Speech_{n,k}$, otherwise [Equation 2]

Figure 20:
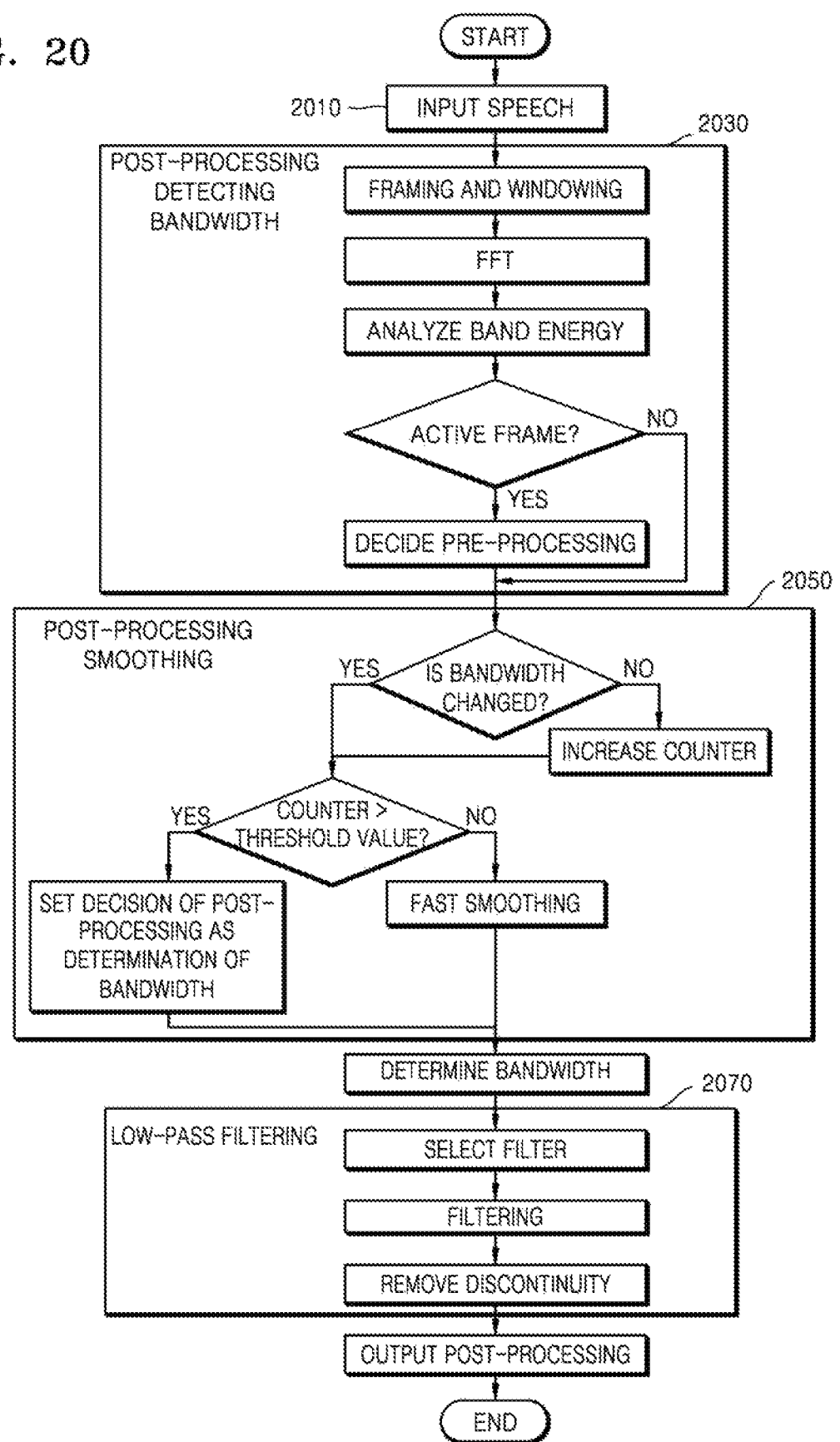
FIG. 20 is a flowchart for describing an operation of a post-processor illustrated in FIGS. 15 and 16.

In the pre-processing deciding block, a detection threshold value may be tuned between −30 dB and −36 dB. A post-processer of FIG. 20 is applied to the post-processing deciding block, and in this regard, according to an embodiment, a detection threshold value may be tuned between −38 dB and −44 dB.

When the smoothed log energy $E_{n,k}$ is greater than the detection threshold, a corresponding band is determined as a speech band, and an output of the pre-processing decision is a highest-frequency speech band.

In operation 1950, smoothing processing may be performed on an output from operation 1930.

Operation 1950 may include a bandwidth change determining block, a threshold value comparing block, and a smoothing block.

When the output from the pre-processing deciding block in operation 1930 is same in at least 5 sequential frames, $B_n$ that is a bandwidth detection result may be determined as below.

$B_n = E_{n,k}$

When it is different, $B_n$ that is the bandwidth detection result may be determined due to smoothing processing.

$B_n = \alpha \times D_n + (1-\alpha) \times B_{n-1}$

In this regard, a value of α may be 0.05 in a pre-processor, and may be 0.95 in a post-processor, but the disclosure is not limited thereto.

FIG. 20 is a flowchart for describing an operation of a post-processor illustrated in FIGS. 15 and 16.

Figure 19:
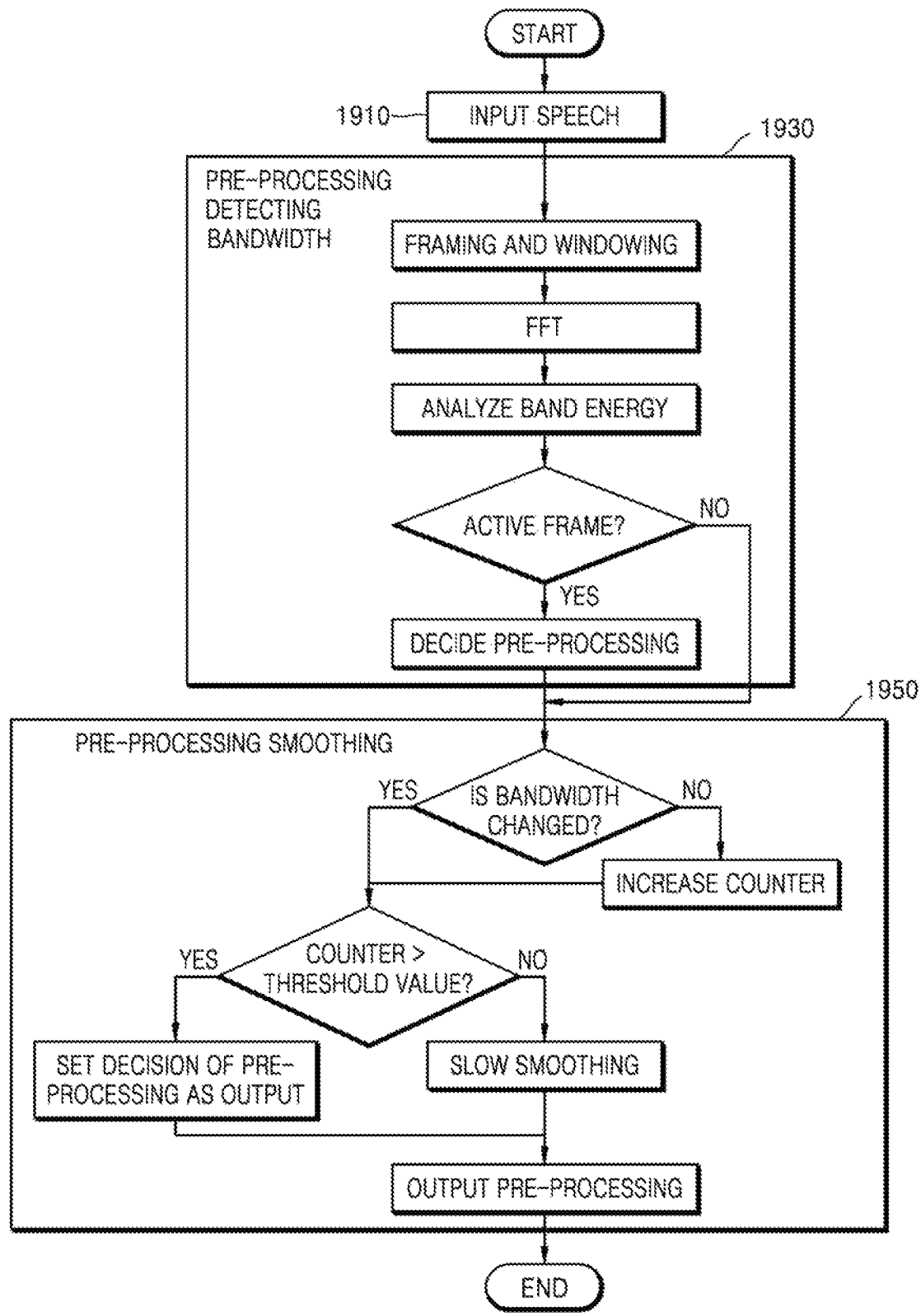
FIG. 19 is a flowchart for describing an operation of a pre-processor illustrated in FIGS. 10 and 11.

In FIG. 20, operations 2010, 2030, and 2050 are substantially equal to operations 1910, 1930, and 1950 of FIG. 19, and are different in threshold values. An added feature to FIG. 20 is operation 2070 that involves performing low-pass filtering.

Figure 22:
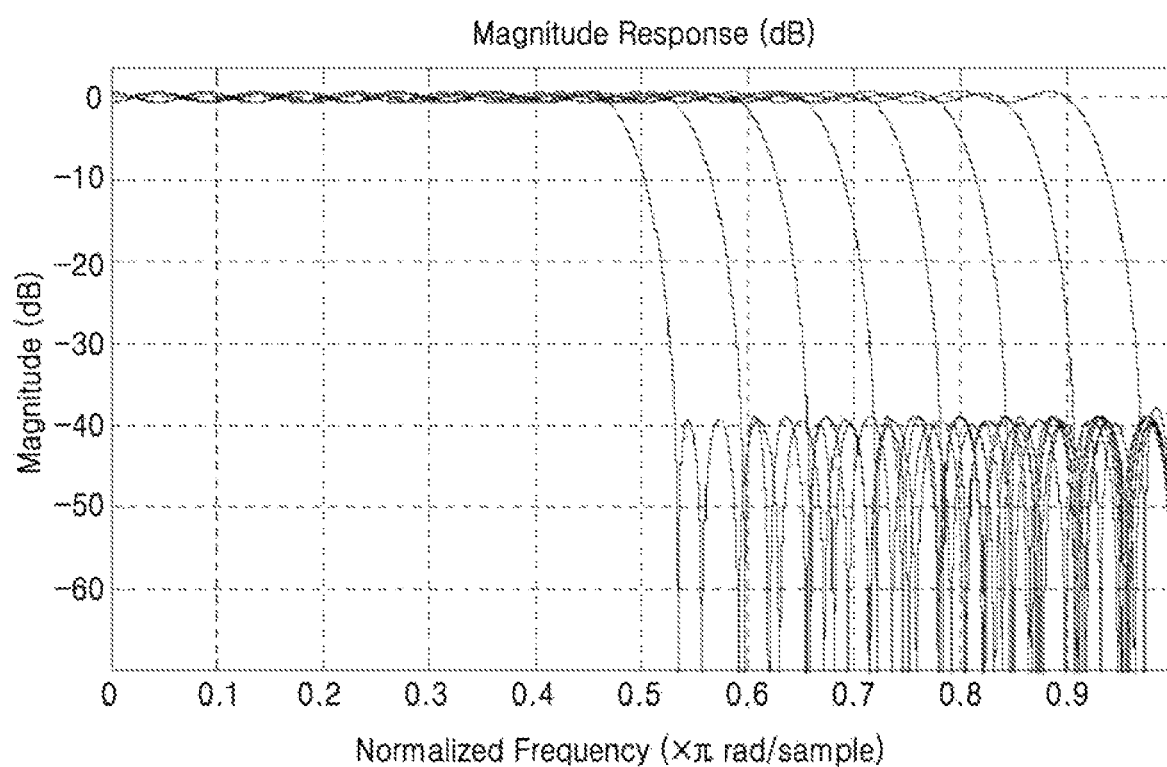
Figure 23:
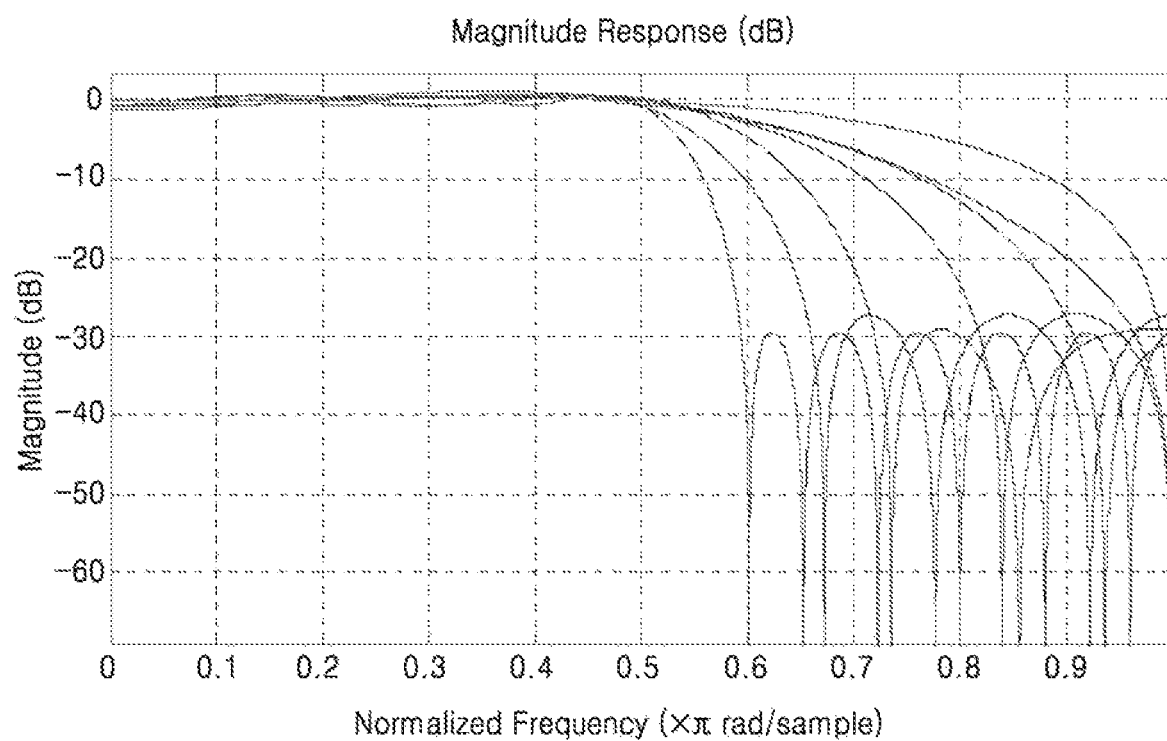

Operation 2070 may include a filter selecting block, a filtering block, and a discontinuity removing block. In operation 2070, low-pass filtering may be performed to remove a signal corresponding to a frequency higher than a selected band, according to a bandwidth detection result. To do so, one or more LPFs may be used, and each filter may have a cut-off frequency corresponding to a bandwidth determination result. For example, at least one of three filters illustrated in FIGS. 21 through 23 may be selected and used.

Figure 21:
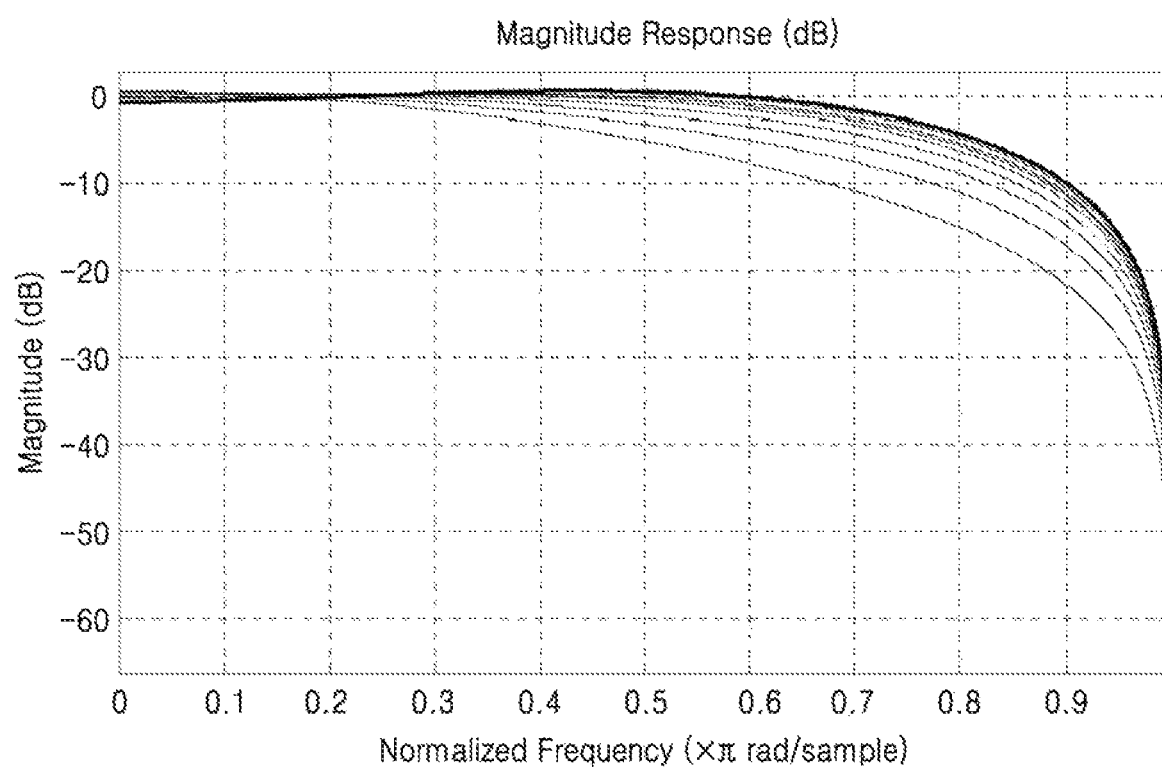
FIGS. 21 to 23 illustrate examples of a low-pass filter (LPF).

In an LPF illustrated in FIG. 21, amplitude response gains are monotonously decreased, and gains converge to minus infinity at a Nyquist cut-off frequency. In an LPF illustrated in FIG. 22, amplitude response gains have same roll down curves and have different cut-off frequencies. In an LPF illustrated in FIG. 23, amplitude response gains have different roll down curves.

In the discontinuity removing block, discontinuity that is present after filtering may be removed. A bandwidth determination result of n−1 frame is $W_{n-1}$, and a bandwidth determination result of n frame is $W_n$. In addition, constant M may be defined, where a value of M may be present, but is not limited to, in the range of 0<M<subframe length/16. In the case of $W_{n-1}<W_n$, first M samples of frames n are filtered by using filters respectively corresponding to $W_{n-1}$ and $W_{n-1}+1$. In the case of $W_{n-1}>W_n$, first M samples of frames n are filtered by using filters respectively corresponding to $W_{n-1}$ and $W_{n-1}-1$. When it is assumed that filtered results are T1[M] and T2[M], respectively, an output signal O[M] may be calculated by using Equation 3 below.

$$O[m] = \frac{M-m+1}{M} \cdot T1[m] + \frac{m+1}{M} \cdot T2[m] \qquad [\text{Equation 3}]$$

where, 0≤m<M.

In the case of $W_{n-1}<W_n$, $W_{n-1}$ is increased, and a same process is performed on next M samples until $W_{n-1}+1=W_n$ is achieved. In the case of $W_{n-1}>W_n$, $W_{n-1}$ is decreased, and a same process is performed on next M samples until $W_{n-1}-1=W_n$ is achieved.

The embodiments may be embedded in a multimedia device (not shown). The multimedia device may include a communicator (not shown) including at least one antenna, an encoding module (not shown), and a decoding module (not shown). According to use of an audio bitstream obtained as an encoding result or a reconstructed audio signal obtained as a decoding result, a storage (not shown) configured to store the audio bitstream or the reconstructed audio signal may be further included. In this regard, the encoding module and the decoding module may be integrally formed with other elements arranged in the multimedia device and may be implemented as one or more processors.

The communicator may receive at least one of audio and an encoded bitstream provided from an external source, or may transmit at least one of reconstructed audio and an audio bitstream obtained as an encoding result from the encoding module.

The encoding module including various codecs may perform encoding on audio or a speech signal and thus may generate a bitstream or a packet. When the encoding module performs encoding on the audio or the speech signal, the encoding module may apply the signal processing according to the aforementioned embodiments. According to an embodiment, the signal processing may involve determining, based on a plurality of parameters, a valid bandwidth so as to encode an input signal, performing pre-processing on the input signal, based on the valid bandwidth, and encoding the pre-processed input signal, based on the valid bandwidth.

The decoding module may be implemented to correspond to the encoding module or may be independently implemented. The decoding module may receive a packet or a bitstream provided via the communicator, and may apply the signal processing according to the aforementioned embodiments so as to perform decoding. According to an embodiment, the signal processing may involve decoding a bitstream or a packet received via a transmission channel, determining a valid bandwidth, based on a plurality of parameters used in the decoding, and performing post-processing on the decoded signal, based on the valid bandwidth.

The storage may store various programs required in operating the multimedia device. The microphone may provide an audio signal from a user or an external source to the encoding module.

The multimedia device may include, but is not limited to, a voice communication-dedicated terminal including a phone, a mobile phone, etc., a broadcasting or music-dedicated device including a television (TV), an MP3 player, etc., a convergence terminal device of the voice communication-dedicated terminal and the broadcasting or music-dedicated device, or a user terminal of teleconferencing or interaction system. In addition, the multimedia device may be used as a client, a server, or a converter arranged between a client and a server.

In the case where the multimedia device is the mobile phone, although not illustrated, the multimedia device may further include a user input unit such as a keypad, a display configured to display information processed in a user interface or the mobile phone, and a processor configured to control general functions of the mobile phone. The mobile phone may further include a camera having an image-capturing function and at least one element configured to perform a function necessary in the mobile phone.

In the case where the multimedia device is the TV, although not illustrated, the multimedia device may further include a user input unit such as a keypad, a display configured to display received broadcasting information, and a processor configured to control general functions of the TV. The TV may further include at least one element configured to perform a function necessary in the TV.

The embodiments can be written as computer-executable programs and can be implemented in general-use digital computers that execute the programs using a computer-readable recording medium. In addition, data structures, programmed commands, or data files that can be used in the embodiments of the present disclosure may be recorded to the computer-readable recording medium by using various means. The computer-readable recording medium may be any data storage device that can store data which can be thereafter read by a computer system. Examples of the computer-readable recording medium include magnetic media including hard disks, floppy disks, and magnetic tapes, optical media including CD-ROMs and DVDs, magneto-optical media including floptical disks, and hardware designed to store and execute the programmed commands in ROM, RAM, a flash memory, and the like. The computer-readable recording medium may be a transmission medium that transmits a signal designating the programmed commands, the data structures, or the like. Examples of the programmed commands include not only machine code made by a compiler but also include a high-level programming language to be executed in a computer by using an interpreter.

While embodiments of the present disclosure have been described with reference to the limited embodiments and drawings, the embodiments of the present disclosure are not limited to the aforementioned embodiments, and various modifications and changes may be made from the descriptions by those of ordinary skill in the art. Therefore, the scope of the present disclosure is defined not by the detailed description but by the appended claims, and all changes and equivalents within the scope will be construed as being included in the present disclosure.

The invention claimed is:

1. A method of processing an input signal including at least one of an audio signal and a speech signal processing apparatus, the method comprising:
   determining a valid bandwidth, based on a plurality of parameters determining via a call condition negotiation process between terminals;

obtaining a number of continuous frames having a same valid bandwidth;

when the number of continuous frames having the same valid bandwidth exceeds a threshold, performing pre-processing on the input signal, based on the determined valid bandwidth;

when the number of continuous frames having the same valid bandwidth does not exceed the threshold, performing smoothing on the determined valid bandwidth and performing the pre-processing on the input signal based on the smoothed valid bandwidth; and encoding the pre-processed input signal, based on the valid bandwidth to generate a bitstream.

2. The method of claim 1, wherein the plurality of parameters comprise at least one of a bit-rate, a sampling frequency, and a bandwidth, which are determined via the call condition negotiation process between the terminals.

3. The method of claim 1, further comprising generating the bitstream as a packet having a preset format, wherein the bitstream is generated as a result of the encoding.

4. The method of claim 1, wherein the determining of the valid bandwidth comprises:
converting the input signal to a frequency-domain signal;
classifying the frequency-domain signal; and
searching for and selecting the valid bandwidth of the input signal, based on a threshold value that is set according to a result of the classifying.

5. The method of claim 1, wherein the determining of the valid bandwidth comprises:
converting the input signal to a frequency-domain signal;
removing a noise component from the frequency-domain signal; and
searching for and selecting the valid bandwidth with respect to an active signal that is left after the removing of the noise component.

6. The method of claim 1, wherein the encoding is performed by limiting at least one of a maximum band and a minimum band, based on the determined valid bandwidth.

7. The method of claim 1, wherein the performing of the pre-processing comprises performing at least one of low-pass filtering processing and bandwidth extension processing.

8. A apparatus for transmitting an input signal including at least one of an audio signal and a speech signal, the apparatus comprising:
a processor configured to;
determine a valid bandwidth, based on a plurality of parameters determined via a call condition negotiation process between terminals,
obtain a number of continuous frames having a same valid bandwidth,
when the number of continuous frames having the same valid bandwidth exceeds a threshold, preform pre-processing on the input signal, based on the determined valid bandwidth,
when the number of continuous frames have the same valid bandwidth does not exceed the threshold, perform smoothing on the determined valid bandwidth and perform the pre-processing on the input signal based on the smoothed valid bandwidth, and
encode the pre-processed input signal, based on the valid bandwidth to generate a bitstream; and
a communicator configured to transmit the bitstream provided from the processor.

9. The apparatus of claim 8, wherein the processor is further configured to encode the pre-processed input signal by limiting at least one of a maximum band and a minimum band, based on the determined valid bandwidth.

\* \* \* \* \*